(12) United States Patent
Newton

(10) Patent No.: US 7,063,276 B2
(45) Date of Patent: Jun. 20, 2006

(54) SYSTEM FOR UNIFORM DISPERSAL OF AGRICULTURAL CHEMICALS

(75) Inventor: Gary D. Newton, Eckley, CO (US)

(73) Assignee: Agri-Inject, Inc., Yuma, CO (US)

( * ) Notice: Subject to any disclaimer, the term of this patent is extended or adjusted under 35 U.S.C. 154(b) by 196 days.

(21) Appl. No.: 10/806,790

(22) Filed: Mar. 23, 2004

(65) Prior Publication Data

US 2005/0211802 A1    Sep. 29, 2005

(51) Int. Cl.
  *A62C 13/62*    (2006.01)
  *A01G 25/09*    (2006.01)
  *B05B 9/06*    (2006.01)
  *B05B 3/02*    (2006.01)

(52) U.S. Cl. ............... 239/302; 239/146; 239/158; 239/159; 239/161; 239/163; 239/166

(58) Field of Classification Search .......... 239/302, 239/146, 158, 159, 161, 163, 166, 722, 726, 239/337
See application file for complete search history.

(56) References Cited

U.S. PATENT DOCUMENTS

| | | | |
|---|---|---|---|
| 3,599,866 A * | 8/1971 | Bolton | 239/8 |
| 4,231,306 A | 11/1980 | Whitehead et al. | |
| 4,300,461 A | 11/1981 | Hodge et al. | |
| 4,473,016 A | 9/1984 | Gust | |
| 4,528,919 A | 7/1985 | Harbolt et al. | |
| 4,756,339 A * | 7/1988 | Buluschek | 138/115 |
| 5,460,106 A | 10/1995 | Crockett et al. | |
| 5,957,621 A * | 9/1999 | Clark et al. | 404/111 |
| 6,070,539 A | 6/2000 | Flamme et al. | |
| 6,216,752 B1 * | 4/2001 | Bailey | 141/236 |
| 6,360,681 B1 | 3/2002 | Swanson | |
| 6,427,612 B1 | 8/2002 | Huffman | |
| 6,431,096 B1 * | 8/2002 | Engelke et al. | 111/127 |
| 6,484,652 B1 | 11/2002 | Colburn, Jr. | |
| 6,901,698 B1 * | 6/2005 | Manning | 47/48.5 |

* cited by examiner

*Primary Examiner*—Davis Hwu
(74) *Attorney, Agent, or Firm*—Lee G. Meyer, Esq.; Meyer & Associates, LLC

(57) ABSTRACT

A system for uniformly dispensing agricultural chemicals in soil comprises a holding reservoir for the liquid agrichemicals, at least one multi-port uniform dispersing manifold or splitter, and a number of dispensing delivery tubes for dispensing the chemicals proximate openings or slits in the soil during various functions such as planting. The liquid agricultural chemicals, within the system, flow, under pressure, from the reservoir to the exit orifice of each delivery conduit. The multi-port, uniform liquid dispersing manifold passively equally and uniformly, divides the incoming fluid stream to provide separate, but substantially equal, divided fluid streams exiting the manifold to individual delivery conduits. The fluid stream flowing through the fluid inlet of the manifold, under pressure, impinges a planar surface, disposed at one end of the manifold inlet, substantially perpendicular to the fluid flow and proximate the manifold exits, such that the fluid stream is radially dispersed and uniformly divided among the exit ports of the manifold. Advantageously, the fluid exit ports which are radially disposed about the fluid inlet have a longitudinal axis substantially perpendicular to the fluid flow in the fluid inlet causing the direction of the exit a flow to be substantially perpendicular to the fluid flow in the fluid inlet.

26 Claims, 4 Drawing Sheets

SYSTEM FOR UNIFORM DISPERSAL OF AGRICULTURAL CHEMICALS

BACKGROUND OF THE INVENTION

1. Field of the Invention

The present invention relates generally to direct dispensing systems for liquid, agriculturally based chemicals; and, more particularly, to agriculture chemical dispensing systems for nozzle-less, uniform, direct delivery of liquid agriculture chemicals to the soil.

2. Description of Related Art

Agriculture is a multi-billion dollar business in the United States and throughout the world. Especially in the United States, agricultural techniques and science have advanced dramatically. Increased yield and decreased labor, with earlier maturity, and hardier plants, have led to a new efficiency and productivity in farming. For example, hybrid seeds are produced, which are matched to specific soils, climates, and the like, as well as being resistant to certain pests, bacteria and fungi.

Fertilizers, herbicides, fungicides, additives, enhancers and other agrichemicals have been refined to the point that they increase yield dramatically, even in the absence of ideal soils and growing conditions. For example, chemigation is used to apply fertilizers and other agrichemical products through an irrigation system. This procedure involves the introduction of agriculturally based chemicals into irrigation water to provide for intimate admixing of the chemicals and the irrigation water stream, such that the subsequent dispersion of the irrigation water carries, well admixed therein, the agrichemicals onto the cropland. Chemical products, such as fertilizers, insecticide, pesticides, herbicides, fungicides, etc., can be dispensed by this method. Such chemicals, however, need be well dispersed in the irrigation water prior to the water being sprayed upon the cropland. This technology has reached a point where agrichemicals, even those that are hydrophobic, can be uniformly disbursed in the aqueous flow of the irrigation method. Much time and effort has been devoted to uniformly delivering such agrichemicals by these means.

However, as effective as chemigation is, there are certain draw-backs to this method of delivering or disbursing agrichemicals to a crop. One draw-back is that the agrichemicals can only be delivered to the crop during watering. Another is that this broadcast type distribution is not "site specific" for the particular application, thus, resulting in application of a greater amount of agrichemicals than needed, increasing costs.

In an attempt to mitigate these problems, other agrichemical dispensing systems have evolved for application of agrichemicals directly to or even beneath the soil proximate the seed or plant sometimes in combination with other farming operations such as tilling. Crop dusting from an airplane is one method, but has obvious drawbacks, especially for highly toxic materials. Additionally, this aerial spray method is not effective in transferring agrichemicals directly to the soil. Another delivery system involves use of spray nozzles, which are positively fed by pressurization and are moved over the terrain to be treated by means of mobile implements or trailers. These systems, usually pulled behind a tractor, position a nozzle proximate the ground to be treated. Although useful for some topical applications, these systems also have draw-backs. First, the spraying from a nozzle results in airborne particles or mist, which is not only wasteful, but can result in contamination of other crops, animals, inhabitants, and the like including the tractor operator. Additionally, the application is topical, which does not always bring the agrichemical in contact with the seed, plant, or the like, i.e. nozzles are usually used in a soil surface application. Further, nozzle systems are not precise, spraying material over a wider area than necessary for the specific application; and, finally, nozzles tend to clog.

One way of overcoming the draw-backs of using a surface application nozzle is to directly deposit the liquid additive or agrichemical into a furrow, slit, or other indentation or cut in the soil, preferably during some agricultural operation such as tilling, planting, weeding(cultivating), or the like. In accordance with this method, hoses or tubes connected to a reservoir of the agrichemical to be applied are placed proximate, but behind the tine, disk, or row planter to deposit a measured amount of chemical such as fertilizer, insecticide, herbicide, or the like beneath the soil proximate the seed, the plant root and/or the tilled soil.

Many devices have been suggested for regulating and/or controlling the amount of chemical delivered to the tip of each delivery tube to assure uniform distribution across the entire width of the implement toolbar. One problem in delivering a uniform amount of agrichemical containing liquid to the dispersing end of the delivery tube is the lack of any type of restraining device to provide a back pressure at the end of the delivery tube. That is, the tube end is open. For example, with nozzle delivery systems, the nozzle presents the resistance to flow, which creates a back pressure in the system, kind of like a sprinkler system, which equalizes the flow through each of the unobstructed nozzles within the network.

Since direct distribution or open tube systems do not employ such a back pressure device, the material must be uniformly divided into the delivery tube prior to its expulsion onto the particular application proximate the agricultural target. In addition, the delivery tube sizing is important in restricting fluid flow against the pressure of the system through the distribution manifold. Many mechanized and electric flow meters have been proposed to individually regulate the amount of material passing into, and thus, out of the delivery tubes. These systems, in addition to being expensive, are complicated to regulate.

Mechanized agriculture, although efficient, puts substantial operational environment stress on mechanical devices. Farming, including tilling, planting, and cultivating, all involve equipment operation in the presence of a substantial amount of dirt, sand, grit, and the like. Therefore, complicated devices, which involve electromechanical valves, valve seats, and the like, require a high degree of maintenance for efficient operation. Agrichemical dispensing systems, which usually are carried on a toolbar behind, for example, a tractor, are subject to large amounts of this dust, dirt, and the like. Therefore, it would be advantageous to have a simple system that does not employ individual valves, flow meters, and the like, to uniformly dispense aliquots or drops of the liquid material proximate the work area in the soil.

Unfortunately, passive dividers, splitters, and manifolds of the prior art do not provide the consistency of the liquid agrichemical liquid stream splitting or dividing to assure uniform distribution of the feeder stream to the individual delivery tubes. For example, the prior art splitter or divider shown in FIG. 1, merely branches a single feeder stream into three branches. Thus, as can be seen from the FIG. 1, the center branch has less resistance than the two side branches and, thus, without further regulation will carry more agrichemical than the side branches. Likewise, as shown in FIG. 2, a prior art linear manifolds involve a series of nipples or connection at right-angle to the fluid flow, which allow the linear flow of material to exit along the vertical access of the manifold through the connectors. Again, as can be seen, the flow rates through all of the connections will not be uniform from this device.

In today's "super" mechanized farm implement era, planters, tillers, cultivators, and the like are pulled behind large tandem-tired tractors of substantial power. This allows use of large toolbars, which cover broad areas of the field. In modern agricultural setting, agricultural toolbars spanning fifty to a hundred feet are not uncommon. When direct application or open delivery tube systems are utilized, these large toolbars require an extensive network of fluid dividers and conduits connecting the reservoir to the delivery tube. Delivering a uniform amount of agrichemical material to each workpiece along these long toolbars, therefore, becomes a substantial challenge. These complex delivery networks make it difficult, if not impossible to deliver a uniform aliquot of agrichemical to each individual delivery tube for application. Clogging of a gang of delivery apparatus or even a single apparatus can detrimentally affect the crop yield.

Figure 1:
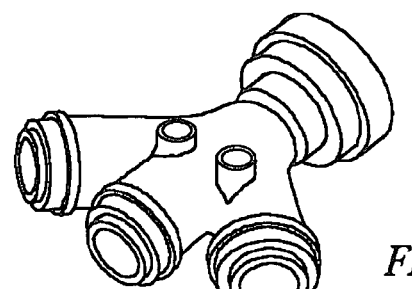
Figure 2:
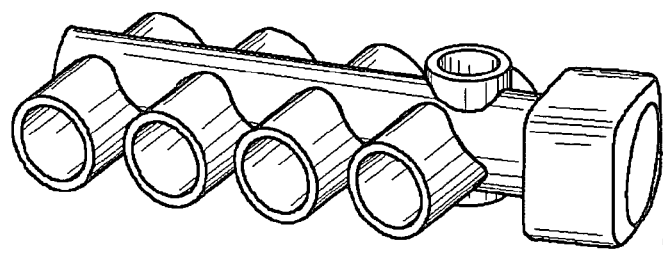

It would be, therefore, advantageous to have a simple, reliable system for uniformly disbursing agrichemicals by dripping such agri-chemicals from the exit end of the delivery tube proximate the working surface of a tilling, planting, or furrowing implement, which is highly adjustable. It would further be desirable to have such a system, which could employ numerous branches in series, yet delivers uniformly the liquid material to be disbursed at the exit end of each delivery tube without complicated valves, flow meters, or the like.

SUMMARY OF THE INVENTION

It has been found that the above described disadvantages can be overcome with the agrichemical dispersing system of the instant invention. The instant fluid dispersing system is passive, requiring only pressurized fluid for operation. Liquid dispensed from the exit orifice of a system delivery tube flows into the broken soil proximate a work piece to provide precise, even distribution of the dispensed material.

The system for uniform dispersal of liquid agricultural based chemicals of the instant invention comprises a reservoir in fluid communication with the inlet portion of at least one multi-port uniform dispensing manifold, the exit ports of which are in liquid communication with a delivery conduit having an exit orifice proximate the work area. The liquid agricultural chemicals, within the system, flow, under pressure, from the reservoir to the exit orifice of the delivery conduit. The system pressure is provided by, for example, pressurizing the reservoir with, for example, a tractor run compressor; or, is provided by a chemical resistant fluid pump, which may have variable output, placed upstream of the first, at least one multi-port uniform dispensing manifold.

The instant inventive system employs at least one multi-port, liquid dispersing manifold for passively, uniformly, dividing an incoming flowing fluid stream to provide at least two separate, but substantially equal, divided fluid streams exiting the manifold into the inlet end of a delivery conduit. That is, the entry stream is divided substantially equally among the exit ports. In an advantageous embodiment the multi-port uniform liquid dispersing manifolds are tiered, in series, to provide a multiple manifolded network.

The novel, multi-port uniform liquid dispersing manifold of the instant invention includes a fluid inlet in fluid communication, on one end, with a liquid containing reservoir; and, on the other, with at least two separate fluid exit ports or outlets, each advantageously having a lesser diameter than the fluid inlet and each in fluid communication with a delivery conduit and radially disposed about the fluid inlet. The fluid stream flowing through the fluid inlet, under pressure, impinges a planar surface, disposed within the inlet substantially perpendicular to the fluid flow and proximate the fluid exit ports or outlets, such that the fluid stream passing through the fluid inlet exits the multi-port uniform liquid dispersing manifold, uniformly divided, through each of the fluid exit ports passing into the inlet of a delivery conduit. Advantageously, the fluid exit ports have a longitudinal axis substantially perpendicular to the fluid flow in the fluid inlet causing the direction of the exit a flow to be substantially perpendicular to the fluid flow in the fluid inlet.

Specifically, the fluid inlet comprises a conduit having an upper portion and a lower portion with a channel therethrough. Disposed within the lower portion, proximate the receiving orifice of the fluid exit port, is a planar surface disposed such that the fluid stream, passing through the fluid inlet conduit channel, impinges the planar surface and radially exits the multi-port uniform liquid dispersing manifold through the fluid exit ports in equally divided portions, advantageously, in a flow direction substantially perpendicular to the flow of the fluid within the fluid inlet conduit channel. Thus all the inlet fluid is caused to change direction by impinging the planar surface such that the receiving orifices receive an equally divided amount of the fluid entering the fluid inlet.

In operation, the system fluid is placed under pressure and caused to flow through the inlet conduit, impinging upon the planar surface, and exiting in uniform proportions from each of the at least two exit conduits radially disposed to the inlet conduit. In one embodiment, a plurality of channeled openings, corresponding to the receiving orifice of each exit conduit, direct the radial flow of the fluid stream impinging upon the planar surface to each exit conduit. For the purpose of explanation without limitation, it is believed that the dispersing change of direction of the incoming stream and the radial deposition of the exit ports provides an equal radial dispersion to provide an equally divided, uniform fluid flow through each of the exit conduits.

BRIEF DESCRIPTION OF THE DRAWINGS

The following drawings form part of the present specification and are included to further demonstrate certain embodiments. These embodiments may be better understood by reference to one or more of these drawings in combination with the detailed description of specific embodiments presented herein.

FIG. 1 is a tri-port divider of the prior art;

FIG. 2 is a right-angel, flow through, multi-port manifold of the prior art;

FIG. 3 is an embodiment of the inventive liquid dispersing system for uniform delivery of agricultural chemicals and soil additives;

FIG. 4A is a prospective view of one embodiment of the disbursing manifold of the instant invention;

FIG. 4B is a top view of the disbursing manifold of FIG. 4A;

FIG. 4C is a sectional view of the disbursing manifold shown in FIG. 4B along lines 4C;

FIG. 5A is a prospective view of another embodiment of the disbursing manifold of the instant invention;

FIG. 5B is a sectional view of FIG. 5A along lines 5B;

FIG. 5C is a sectional view of FIG. 5A along lines 5C; and, FIG. 6 is a prospective view of the system as shown in FIG. 1 on an agricultural toolbar showing placement of the delivery tubes;

DISCUSSION OF THE SYSTEM NOMENCLATURE

As used herein, the following terms will have the meanings hereinafter set forth. Delivery tube means a conduit for delivering precise amounts of agrichemicals which can be sized to deliver consistent amounts of liquid dependant upon the pressure of the system. Working tool or implement means an agricultural work piece that contacts the soil such as a tine, furrow disk, or the like. Tine means an elongated earth working element adapted to be dragged through the soil to produce a required opening in the soil. Agrichemical includes pesticides, herbicides, fertilizers, nutrients, and liquid soil additives and/or enhancers of any kind including inorganic compounds, organic compounds, acids, bases or salts.

The term "soil additive" or "soil enhancer" as used herein includes, but is not limited to, liquid or water dissolvable or suspendable pesticides such as herbicides, insecticides, fungicides, nematicides, bactericides, and general biocides. All functional types of pesticides such as fumigants, desiccants, contact toxicants, pheromones, and other biocontrol agents are included in this definition. The term "soil additive" and/or "soil enhancer" also includes liquid or water dissolvable or suspendable fertilizers and trace minerals (micronutrients) both natural and synthetic. The term "soil additive" and/or "soil enhancer" is also meant to include soil adjuvants such as repellants and attractants, growth regulators, pH adjustors, surfactants and other soil amending and pesticide enhancing agents, without limitation.

DETAILED DESCRIPTION OF THE INVENTION

The present invention enhances agriculture production through timely, uniform prescription application of agrichemicals while reducing production costs by saving on both chemical and application costs. Accordingly, a fluid regulating and delivery system for precise placement of various liquid Agrichemicals comprises a uniform fluid dispersing manifold, having no moving parts, in fluid communication with a pressurized fluid delivered from a reservoir to a number of delivery tubes. The inventive system delivers and disperses liquid agrichemicals to the soil during the performance of, for example, planting, tilling, and cultivating operations. The system employs delivery tubes or conduits to deliver a uniform aliquot of agrichemical to the soil proximate the working tool. As the working tool is moved across the field by, for example, a tractor, a precise amount of agrichemical is deposited uniformly proximate the implement. In this manner, a desired amount of agrichemical can be deposited subterraneously or topically to seed, plant, or soil. A fluidic network connects each delivery tube at a row location. Thus, one or more agricultural products, such as, fertilizer, herbicide and pesticide, can be uniformly dispensed at each of a plurality of row locations on an agricultural implement toolbar.

Advantageously, delivery or "drop-tubes" can be positioned on the working tool to accurately position the deposit of the agrichemical for the operation being performed. For example, on a planter, the delivery tubes are attached to the planter tines or drill to deliver a precise amount of fertilizer proximate the dispensed seed without waste or over-fertilization. Flow from the delivery tubes can easily be directed to a precise location such that the loss or drift of product application is minimized as opposed to, for example, nozzle application. In addition, since the application is performed during a farming operation, the agrichemical is covered by soil minimizing exposure to wildlife, cattle, and the like. Likewise, the instant system greatly reduces clogging and blockage that is prevalent with nozzles and sprayers, wherein the sprayed material can evaporate at the nozzle head causing clogging of the nozzle orifices.

In cultivation, a shank structure precedes and shields the trailing portion of the delivery tube. The shank structure has a forward-facing portion adapted to cut through soil. The shank structure and member are moved through the soil by the vehicle in a forward direction. In planting, advantageously, the delivery tube trails the seed tube to deliver the liquid agrichemical aliquot proximate the seed prior to closure of the planting indentation. The delivery tube can precede the seed tube through the furrow, however.

In accordance with the invention, the system applies a uniform amount of agrichemical liquid to the working surface. Due to the flexibility of the system, occasioned by flexible tubing and quick connect fittings, the tubing can be run directly though the hollow steel frame of the implement or attached to the structure with, for example, nylon tiedowns. For example, on a cultivator, the exit ends of the delivery tubes are attached to the cultivator shanks (as shown in FIG. 6) trailing down the furrow just behind the tine. On a planter, the agrichemical liquid is dispensed proximate the seed to allow direct uptake by the germinating seed. On tillage equipment, the delivery tubes may be advantageously attached proximate, for example, sweeps.

Figure 3:
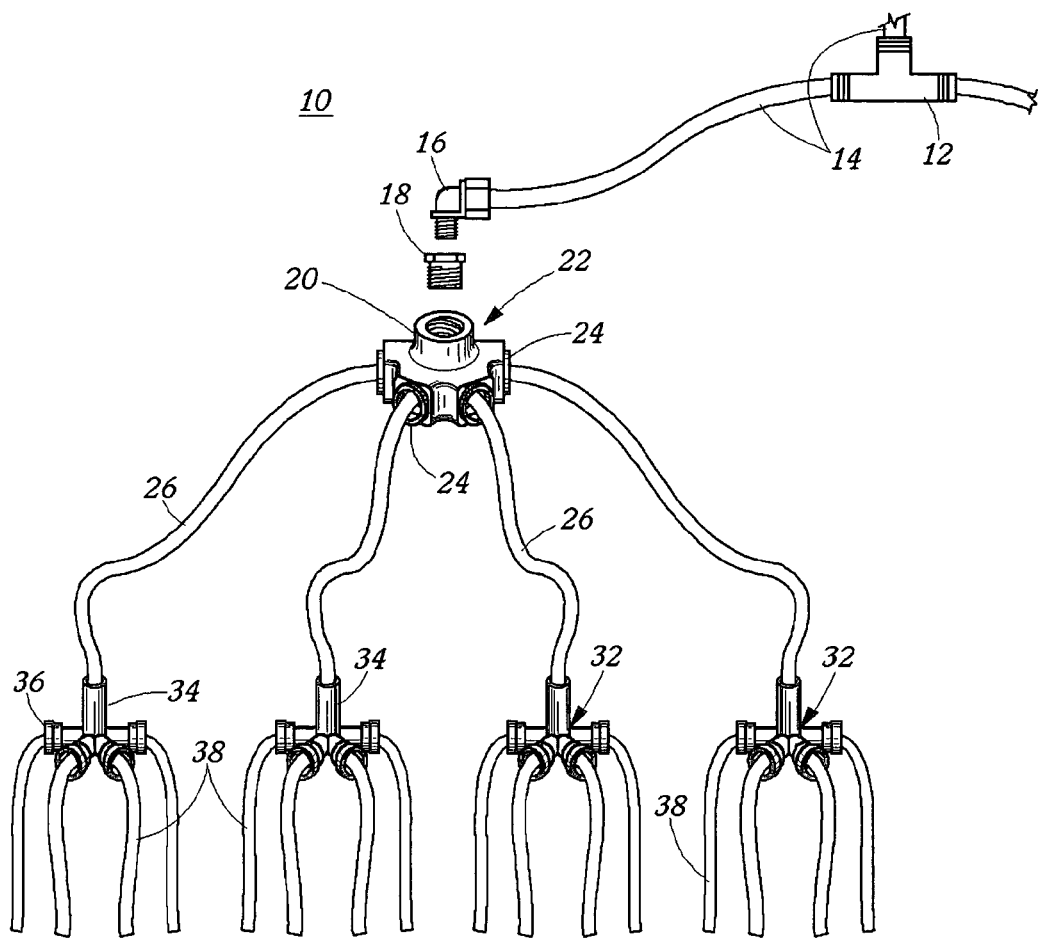

In an advantageous embodiment, more than one manifold may be incorporated into a network, wherein the manifolds, interposed between, and is in fluid communication with, a reservoir, such as a tank, and the delivery tubes are in tiered series as shown in FIG. 3. The network delivery tubes are adjustably disposed upon individual shanks of one or more toolbars adapted for tilling or cultivating the soil and/or proximate seed tubes for planting seed. In one embodiment, the tank is pressurized. In another, a variable liquid pump, downstream of the tank is used to positively flow the liquid through the system.

Reservoirs

The reservoirs that can be utilized in accordance with the instant invention are standard agricultural tanks or containers, which are resistant to the corrosive aspects of agrichemicals. Advantageously, tankage useful with the instant system is mounted on the implement toolbar and can be filled through a caped, threaded opening or the like from a tanker truck, a ferry tank, or the like. The size and number of reservoirs will depend on the application, the amount of material to be delivered, and the ability of the toolbar to support the reservoirs.

In one aspect the reservoirs comprise pressure tanks which hold pressure from a compressor, or the like, to provide system pressure in lieu of a pump. In accordance with this embodiment, pressure is applied to the liquid filled tank and a fluid flow regulator and/or a pressure regulator is employed to maintain fluid pressure in the system.

In another aspect of the instant invention, additional tankage can be used to apply a second agrichemical in conjunction with the first. Thus, for example, while planting, a fertilizer can be applied with amounts of, for example, a herbicide, insecticide, or fungicide. This can be accomplished by use of parallel systems or optional tankage, which can be a single system, such that agrichemicals are alternatively moved in the system to present an alternative disposition of materials at the working tool.

Advantageously, as will be further described below, the system of the instant invention employs two tanks or reservoirs, each of which communicate with, for example, sixteen delivery tubes positioned proximate the working tool.

Pump/Sensor Control Unit

In accordance with the invention, a flow pump is employed to create a positive pressure on the system in order that the precise amount of material can be delivered from the exit end of the delivery tube. Advantageously, the sensor control unit to regulate the flow is disposed proximate the tractor or pulling implement driver's seat. It will be realized by the skilled artisan that the flow rate control and sensor can be computerized and/or involve a dynamic feed back control mechanism, which automatically regulates the flow of material to the soil predicated upon some sensed parameter such as soil moisture, depth of furrow, or the like.

It will be further realized by the skilled artisan that the relationship between the pump flow and the delivery tube size will dictate the amount of material delivered per unit-time. Thus, a pump creating substantial flow, i.e. pressure, will cause a greater amount of liquid material to flow through the system while conversely smaller diameter delivery tube will restrict liquid material flow. Pumps useful in the instant invention are, for example, "super flow delivery" pumps made by Aquatec Water Systems, Inc. 17422 Pullman, Irvine, Calif. 92614. For example, the "550" series, chemical resistance pumps can be used.

Tubing

The tubing to be used in accordance with the instant invention, is, advantageously, for example, PVC, or the like, which is corrosive resistant, yet highly flexible so that the system can be mounted easily on any equipment. The inside diameter of the tubes or conduit will be selected for the particular system employed. When, for example, a system as shown in FIG. 3, is employed, employing 32 delivering tubes, the feeder conduits from the reservoir need not be flexible, depending on the mounting application. However, the delivery conduits or micro-tubes are advantageously flexible to flex with the application, as well as to be movably positioned on the working tool.

The amount of liquid which can be dispensed per unit time from the system is a function of the pressure drop across the system as determined by the induced pressure on the fluid, upstream of the network, and the resistance created by the system. Thus, by regulating the delivery tube size and/or the induced pressure, the system can be passively adjusted without the need for mechanical valveing and the like.

Thus, as the diameter of the delivery tube decreases, it increases the impedance and reduces the flow through the tube. The tubing is thus sized for a specific pressure drop. The pressure drop is known over the given length of a particular diameter tube. For example, a system of four foot of tube and a starting pressure of 30 psi, with a five pound loss of pressure per foot, will have an end line pressure of 10 psi. Tube, flow is simply calculated at a given pressure. When using a delivery conduit of a known diameter and length that is operating at a given pressure, the flow capabilities can be determined with good accuracy. By using multi dispersing manifolds in series, networks of multiple decreasing sized manifolds in series can be structured, reducing tubing requirements and equalizing delivery tube flow over large implement toolbars.

Multi-Port Manifolds

Advantageously, the multi-port uniform liquid dispersing manifold of the instant invention comprises an inlet conduit having a passageway extending longitudinally therethrough. The passage has an inlet end in fluid communication with the liquid reservoir and an outlet end circumscribed by a substantially planar surface at the outlet end. The passage in the inlet conduit is in fluid communication, proximate the planar surface, with the at least two, radially disposed fluid exit ports which in turn each fluidly communicate with a single delivery conduit.

Thus, the fluidic substance, under pressure, enters the passageway and impinges the planar surface, changing the direction of flow. The fluidic substance then exits the manifold through the at least two exit ports. The liquid pressure on planar surface causes the impinging liquid to disperse radially in a uniform manner and thus uniformly exits the manifold through each of the exit ports, that is, each exit port flows at substantially the same flow rate. This facilitates uniform delivery of liquid to each delivery tube in the system.

It will be realized that the inventive manifolds or dividers, in accordance with the instant invention, can be of different inlet and exit port sizes depending on the placement of the manifold within the system. Advantageously, the manifolds of the instant invention comprise a single inlet and multiple exit ports. The exemplary manifolds employ four exit ports, but this number could be more or less depending upon the flow rate desired and the particular application. The manifolds of the instant invention are elegant in their simplicity and allow uniform dispersion of the agrichemical liquid to the various exit ports. A dispersion plate or surface is disposed in the inlet channel such that the surface is perpendicular to the flow causing the liquid striking the plate or surface to be disbursed radially at right angles to the inlet flow in a uniform manner such that the amount of liquid leaving the manifold by means of the exit ports is uniformly distributed to each of the exit ports irrespective of number of ports employed.

Advantageously, the exit ports of the instant invention are of equal diameter which diameter is less than the diameter inlet. This configuration is not necessary to advantageously use the invention. As can be readily seen by the skilled artisan, the relative inside diameters of the inlet to the inside diameter of the exit ports, determines the flow of material through the manifold. Thus, in contrast to prior art manifolds, the material distributed by the manifold of the instant invention is positively caused to change direction and is, therefore, radially disbursed uniformly in a plane substantially perpendicular to the plane corresponding to the flow of the entering material. As can be seen in FIG. 1 and FIG. 2, representing prior art manifolds, this dispersion dynamic is not present in either prior art manifolds. It will be realized that the exits ports need not by at right angles to the entering fluid flow; however the more oblique or obtuse the angle the greater or less the fluid direction change which will change the performance characteristics of the manifold. Moreover, there are no moving parts in the manifold of the instant invention, such as to require, for example, constant regulation, clogging, blockage, and the like.

Agrichemicals

The pesticide is preferably chosen with reference to the particular subsurface pest which is to be attacked. The pests will generally be weeds, nematodes, insects, or soil borne pathogens. Pesticides, especially insecticides, which have been found to be suitable for use in accordance with the present invention include but are not limited to liquids containing halogenated hydrocarbons such as 1,3-dichloropropene, 1,2-dichloropropane (often used in admixture), ethylenedibromide, dibromochloropropane, bromomethane (referred to as methyl bromide) and tetrachlorothiophene, isothiocynates such as sodium N-methyldithiocarbamate (anhydrous) (referred to as Metam-sodium) and tetrahydro-3,5-dimethyl-2H,1,3,5-thiadiazine-2-thione, organophosphates such as diethyl 1,3-dithiethan-2-ylidenephosphoramidate, 0,0-diethyl S-(ethylthio) methylphosphorodithioate and 0,0-diethyl S[2-(ethylthio)ethyl]phosphorodithioate and carbamates such as 2-methyl-2-(methylthio)propionaldehyde-0-(methylcarbamoyl) oxime, 2,3-dihydro-2,2-dimethyl-7-benzofuranylmethylcarbamate or methyl N',N'-dimethyl-N-[(methyl carbamoyl)oxy]-1-thiooxamimidate. Note that these are merely exemplary pesticides; and the above listing is not meant to be exhaustive or even nearly complete.

Fertilizers, which may be utilized in accordance with the present invention, include but are not limited to, single and mixed solutions or suspensions of nitrogen, phosphate, potassium, and sulfur and all essential macronutrients and micronutrients required for plant growth. Examples of such fertilizers are: monoammonium phosphate (MAP), diammonium phosphate (DAP), ammonium sulfate, other phosphate salts, chloride salts, nitrate salts, other sulfate salts, ammonia, solutions of urea, and all micronutrients, such as iron, manganese, magnesium, copper and the like. Natural, synthetic and chelated sources of soil nutrients which can be applied by the method of the instant invention.

Soil oil adjuvants, which may be utilized in accordance with the present invention, include, but are not limited to: repellants and attractants, growth regulators such as juvenile hormones and plant growth regulators, pH adjustors such as acidifiers and buffers, surface active agents such as soil penetrating and wetting surfactants. Other adjuvants can be used with the foam method to impart desirable soil or pesticide enhancing qualities.

Soil additives, including soil insecticides, along with added agents that are suitable for use in soil application. The liquid material, which may be a solution or a suspension including a colloid, may be comprised of one or more soil additives, a surfactant and water. If the pests that are being controlled are nematodes the pesticide will generally be of a fumigant type. Mixtures of pesticides and fertilizers and/or soil adjuvants may also be applied in accordance with the invention. Thus, for example, a volatile high toxicity pesticide which dissipates quickly might be used along with a residual toxicant and/or repellant and/or fertilizer and/or soil adjuvant.

Turning now to the figures, there is shown various advantageous aspects and embodiments of the instant invention. Specifically, turning to FIG. 3, there is shown an exemplary delivery system 10, for uniform dispersal of agricultural chemicals in accordance with the instant invention. The system shown in FIG. 3 comprises one half of the nominal system, which employs tiers of multi-exit port, uniform dispersing manifolds in series. "T" joint 12 communicates, at the inlet, by means of conduit 14, with a reservoir or tank (not shown) containing the liquid agrichemical to be dispensed through system 10, under pressure. As previously discussed the fluid pressure is applied upstream of "T" joint 12 by pneumatic pressure, pumps, or the like.

Conduit 14 communicates with one exit side of "T" joint 12 and threaded elbow 16, which threadingly engages threaded adaptor 18. Threaded adaptor 18 threadingly engages inlet 20 of multi-exit port, uniform dispersing manifold 22, to form a fluid tight circuit from the reservoir to the inlet of multi-exit port, uniform dispersing manifold 22. Fluid exit ports 24 of multi-exit port, uniform dispersing manifold 22 fluidly communicate, individually, with exit conduits 26, which in turn fluidly communicate with reducing multi-exit port, uniform dispersing manifold 32, in a series fashion as shown. Reducing multi-exit port, uniform dispersing manifold 32 has an upstanding inlet conduit 34 and a plurality of fluid exit ports 36, which are fluidly connected to delivery tubes 38. Reducing multi-exit port, uniform dispersing manifold 32 is more restrictive than multi-exit port, uniform dispersing manifold 22, to reduce tubing requirements and provide a more uniform flow rate "dropdown" over the system network. It will be realized by the skilled artisan that a number of tiers of reducing multi-exit port, uniform dispersing manifolds can be connected in series; however, for most applications a double tier is sufficient.

Figure 4A:
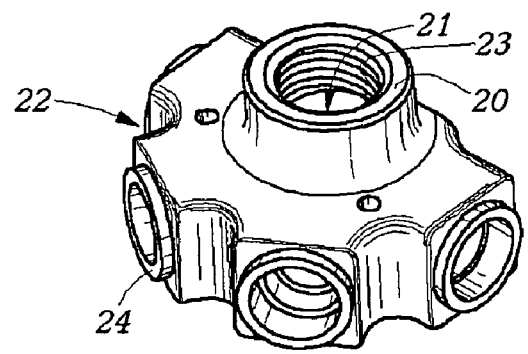
Figure 4B:
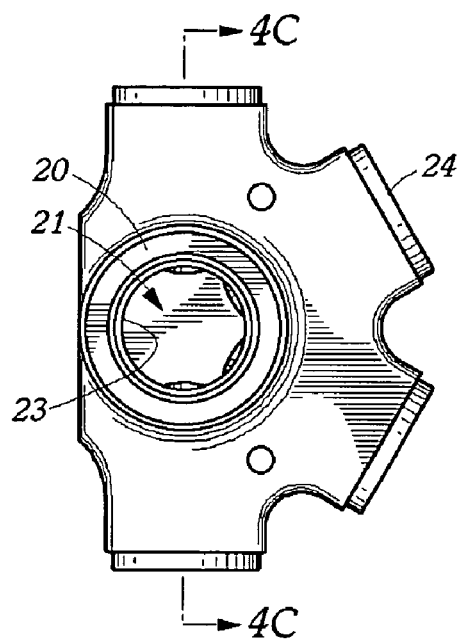
Figure 4C:
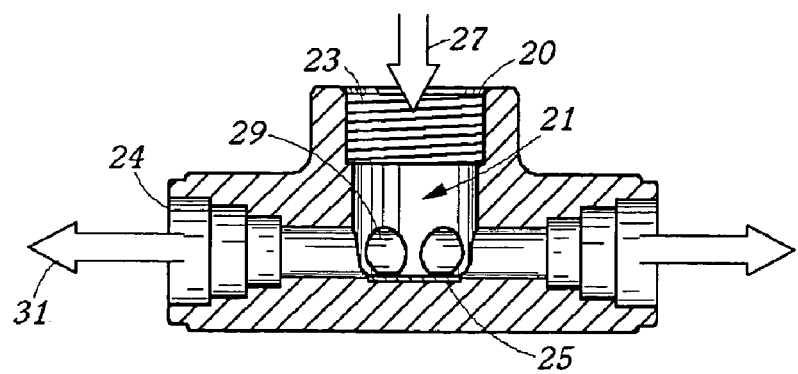

As better seen in FIG. 4A through 4C, multi-exit port, uniform dispersing manifold 22 contains a threaded collar 23 disposed within inlet 20. An inlet channel 21 disposed the length of the inlet 20, which fluidly communicates with the receiving orifices 29 of each of the fluid exit ports 24. Fluid exit ports 24 are adapted to receive frictionally engaging attachments (not shown) to secure exit conduits 26. This allows field assembly and disconnects to change the diameter of the delivery tube and thus the flow. As better seen in FIG. 4C, a planar surface 25 is disposed radially within one end of inlet channel 21, such that fluid entering the inlet 20, as shown by the flow arrow 27, impinges upon planar surface 25 and is uniformly, radially disbursed to flow equally into each receiving orifice 29 exiting through fluid exit ports 24 in the direction of flow arrows 31. In this manner, fluid entering inlet 20 passes through inlet channel 21 in the direction of flow arrow 27, impinges planar surface 25 wherein the direction of the fluid is changed in a radial, uniform division of the incoming fluid stream such that each receiving orifice 29 receives a substantially equal portion of the liquid thus divided, resulting in a uniform flow from each fluid exit port 24 in the direction of flow arrow 31.

Figure 5A:
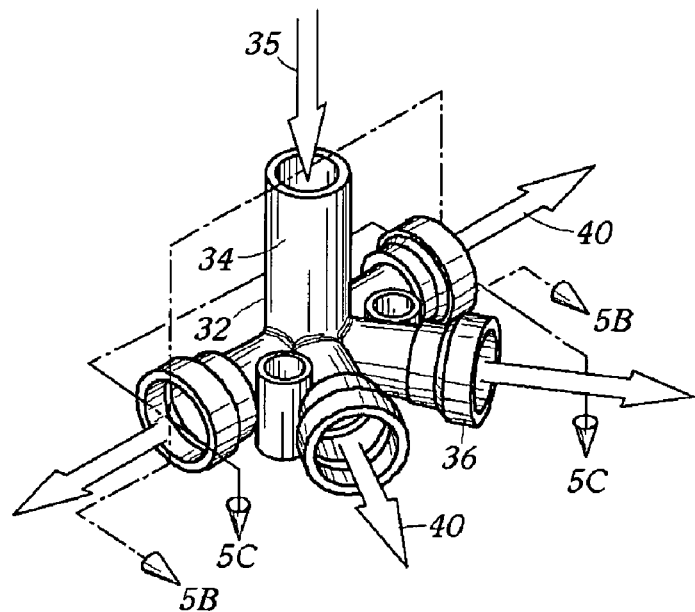
Figure 5B:
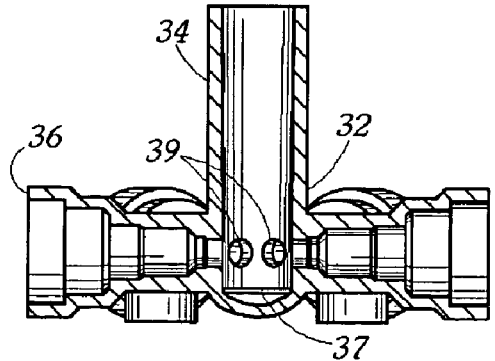
Figure 5C:
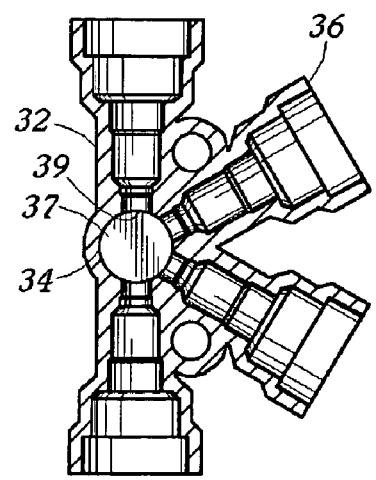
Figure 6:
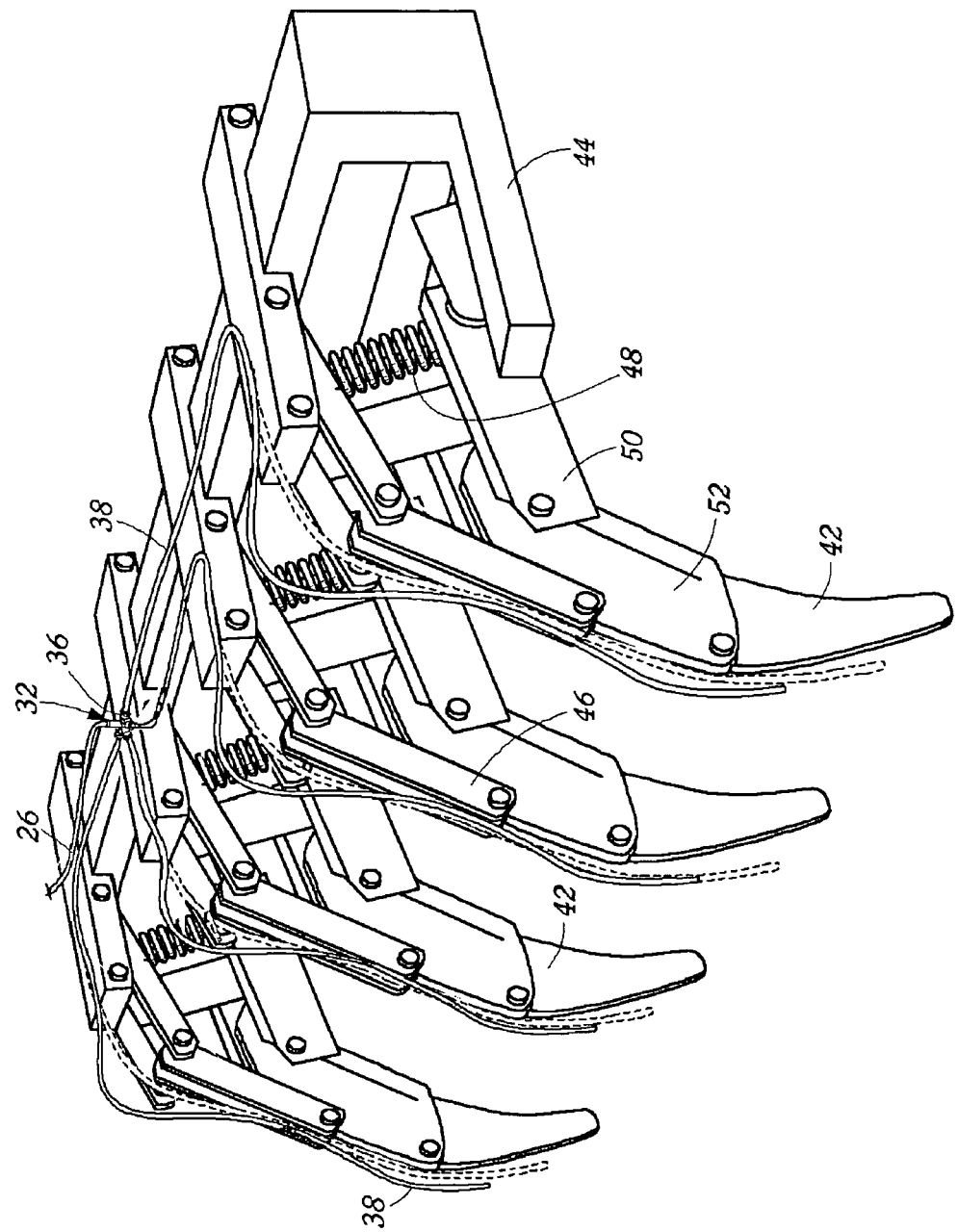

Turning now to FIG. 5A through 5C, there is shown the reducing multi-exit port, uniform dispersing manifold 32. Reducing multi-exit port, uniform dispersing manifold 32 has an upstanding inlet conduit 34 containing a longitudinal channel in fluid communication with a plurality of fluid exit ports 36. The upstanding inlet conduit 34, which is adapted to receive exit conduit 26 on one end; has fluid exit ports 36 on the other, which are adapted to receive delivery tubes 38 as can be seen in FIG. 3. Liquid entering upstanding inlet conduit 34 in the direction of flow arrow 35, impinges on planar surface 37 disposed perpendicular to the fluid flow at the end of the upstanding inlet conduit 34 wherein, as previously described, the direction of the inflowing liquid is radially disbursed to equally exit through receiving orifices 39 in the direction of flow arrows 40 through fluid exit ports 36. As previously described for multi-exit port, uniform dispersing manifold 22, in this manner, fluid entering upstanding inlet conduit 34 passes through the inlet in the direction of flow arrow 35, impinges on planar surface 37 wherein the direction of the fluid is changed in a radial, uniform division of the incoming fluid stream, such that each receiving orifice 39 receives a substantially equal portion of the liquid, thus divided, resulting in a uniform flow from each fluid exit port 36 in the direction of flow arrows 40 and into the inlet of delivery tube 38.

As seen in section view in FIG. 5B, the receiving orifices 39 communicate with the interior of upstanding inlet conduit 34 directly above planar surface 37, and are substantially equal in diameter. As better seen in top sectional view in FIG. 5C, the planar surface 37 is circumferentially disposed in the lower portion of upstanding inlet conduit 34 and forms a surface perpendicular to the incoming fluid flow, but substantially parallel to the exiting fluid flow causing the incoming fluid to impinge upon the planar surface 37, uniformly radially changing direction to a plane substantially parallel to the planar surface 37; thus, equally dividing the impinging fluid into a radial disbursal such that each of the receiving orifices 39 receives an equal portion or aliquot of the exiting liquid. In this manner, no valves or regulators or other mechanical devices are required within multi-exit port, uniform dispersing manifold 32 to assure equal flow of the fluid through fluid exit ports 36.

Turning now to FIG. 6, there is shown one embodiment of the system deployed on a toolbar 44, commonly referred to as an Orthman Cultivator. Toolbar 44 carries, resiliently mounted thereon, working tools connected by an articulating linkage 46, carried on the toolbar 44. Articulating linkage 46 communicates by means of spring 48 to a body 50, which supports standard mount 52.

Exit conduit 26, which exits, for example, from one of the fluid exit ports 24 in multi-exit port, uniform dispersing manifold 22 (not shown), communicates with reducing multi-exit port, uniform dispersing manifold 32 as previously described. (See FIG. 1). As seen in FIG. 6, reducing multi-exit port, uniform dispersing manifold 32 has four fluid exit ports 36, which communicate with delivery tubes 38. Delivery tubes 38 proceed down each individual tool or tine (shank) 42 to terminate rearward, but above the working portion of the tine 42. As can be further seen in FIG. 6, delivery tubes 38 are flexible and can be attached or disposed along the tool to allow material exiting from the delivery tube to be placed more proximate the working surface of tine 42 (delivery tubes shown in phantom.)

The foregoing discussions, and examples, describe only specific embodiments of the present invention. It should be understood that a number of changes might be made, without departing from its essence. In this regard, it is intended that such changes—to the extent that they achieve substantially the same result, in substantially the same way—would still fall within the scope and spirit of the present invention.

What is claimed is:

1. A system for uniformly dispensing a fluidic substance comprising:
   (a) at least one multi-port manifold having an inlet comprising a conduit having an upper portion and a lower portion forming a channel therethrough and having a planar surface disposed radially at the termination of the lower portion, substantially perpendicular to the longitudinal axis of the channel and at least two exit ports disposed substantially radially of the lower portion of said inlet;
   (b) a reservoir, for retaining said fluidic substance, in fluid communication with said inlet;
   (c) delivery conduits, each in fluid communication with one of said at least two exit ports wherein said fluidic substance flowing into said inlet, under pressure, impinges said planar surface and is radially dispersed to provide substantially equal, divided fluid streams exiting the manifold by means of said exit ports.

2. The system of claim 1, wherein said fluidic substance is an agrichemical.

3. The system of claim 1, having two multi-port manifolds in series.

4. The system of claim 1, wherein said pressure is provided by a pump fluidly communicating with said system at a point downstream of said reservoir and upstream of said at least one multi-port manifold.

5. The system of claim 1, wherein said pressure is provided by pressurizing said reservoir.

6. The system of claim 1, wherein said at least one multi-port manifold has three, four, five, or six exit ports.

7. The system of claim 1, wherein said exit ports are disposed substantially perpendicular to the direction of said fluidic substance flowing in said inlet.

8. The system of claim 1, wherein said exit ports each have a lesser diameter than the fluid inlet.

9. The system of claim 1, wherein said exit ports have substantially equal diameter.

10. A multi-port manifold having an inlet comprising a conduit having an upper portion and a lower portion forming a channel therethrough and having a planar surface disposed radially proximate the termination of the lower portion, substantially perpendicular to the longitudinal axis of the channel and at least two exit ports disposed substantially purpendradially of said inlet such that a fluidic substance flowing into said inlet, under pressure, impinges said planar surface and is radially dispersed to provide substantially equal, divided fluid streams exiting the manifold by means of said exit ports.

11. The manifold of claim 10, wherein said at least one multi-port manifold has three, four, five, or six exit ports.

12. The manifold of claim 10, wherein said exit ports are disposed substantially perpendicular to the direction of said fluidic substance flowing in said inlet.

13. The manifold of claim 10, wherein said exit ports have substantially equal diameter.

14. The manifold of claim 10, wherein said exit ports each have a lesser diameter than the fluid inlet.

15. A method for uniformly dispensing a fluidic substance from a plurality of delivery conduits comprising the step of:
   (a) delivering a fluidic substance, under pressure, to the inlet of a at least one multiport manifold having an inlet comprising a conduit having an upper portion and a lower portion forming a channel therethrough and having a planar surface disposed radially at the termination of the lower portion, substantially perpendicular to the longitudinal axis of the channel and at least two exit ports disposed substantially radially of the lower portion of said inlet wherein said exit ports are each in fluid communication with one of said plurality of delivery conduits.

16. The method of claim 15, wherein said fluidic substance is an agrichemical.

17. The method of claim 15, having two multi-port manifolds in series, wherein the delivery conduits emanate from the second multi-port manifold in the series.

18. The method of claim 15, wherein said pressure is provided by a pump fluidly communicating with said system at a point upstream of said at least one multi-port manifold.

19. The method of claim 15, wherein said pressure is provided by pressurizing a reservoir containing said fluidic substance in fluid communication with the inlet of said at least one multi-port manifold.

20. The method of claim 15, wherein said at least one multi-port manifold has four exit ports.

21. The method of claim 15, wherein said exit ports are disposed substantially perpendicular to the direction of said fluidic substance flowing in said inlet.

22. The method of claim 15, wherein said exit ports have substantially equal diameter.

23. The method of claim 15, wherein said exit ports each have a lesser diameter than the fluid inlet.

24. A multi-port manifold for passively, uniformly, dividing an incoming flowing fluid stream to provide separate, but substantially equal exit flow streams comprising:
(a) a fluid inlet comprising a conduit having an upper portion and a lower portion forming a channel therethrough and having a planar surface disposed radially at the termination of the lower portion, substantially perpendicular to the longitudinal axis of the channel;
(b) a plurality of equal diametered exit ports of lesser diameter than the inlet channel comprising a conduit having a receiving orifice on one end and adapted to fluidly communicate with a conduit on the other, deposed radially about said lower portion and in fluid communication with said fluid inlet wherein said incoming flowing fluid stream under pressure, impinges said planar surface and is radially dispersed to provide substantially equal, divided fluid streams exiting the manifold by means of said exit ports.

25. The manifold of claim 24, wherein said at least one multi-port manifold has three, four, five, or six exit ports.

26. The manifold of claim 25, wherein said exit ports are disposed substantially perpendicular to the direction of said fluidic substance flowing in said inlet.

* * * * *